United States Patent
Choe

(10) Patent No.: US 10,860,507 B2
(45) Date of Patent: Dec. 8, 2020

(54) ELECTRONIC SYSTEMS HAVING SERIAL SYSTEM BUS INTERFACES AND DIRECT MEMORY ACCESS CONTROLLERS AND METHODS OF OPERATING THE SAME

(71) Applicant: SK hynix Inc., Icheon-si (KR)

(72) Inventor: Wooyoung Choe, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 15/822,825

(22) Filed: Nov. 27, 2017

(65) Prior Publication Data

US 2018/0300271 A1   Oct. 18, 2018

(30) Foreign Application Priority Data

Apr. 17, 2017   (KR) .................. 10-2017-0049405

(51) Int. Cl.
| | |
|---|---|
| *G06F 13/28* | (2006.01) |
| *G06F 13/40* | (2006.01) |
| *G06F 13/42* | (2006.01) |
| *G06F 13/16* | (2006.01) |
| *G06F 3/06* | (2006.01) |
| *G06F 13/24* | (2006.01) |

(52) U.S. Cl.
CPC ............ *G06F 13/28* (2013.01); *G06F 3/0659* (2013.01); *G06F 13/1642* (2013.01); *G06F 13/1668* (2013.01); *G06F 13/4004* (2013.01); *G06F 13/4282* (2013.01); *G06F 13/24* (2013.01)

(58) Field of Classification Search
CPC ...... G06F 3/0659; G06F 3/0679; G06F 3/061; G06F 3/0613; G06F 13/4022; G06F 13/1642; G06F 13/385; G06F 3/0656; G06F 13/4282; G06F 2213/0026
USPC ........................ 710/52, 5, 308, 316
See application file for complete search history.

(56) References Cited

U.S. PATENT DOCUMENTS

| | | | | |
|---|---|---|---|---|
| 7,308,523 | B1 * | 12/2007 | Ngai ................... | G06F 13/4282 710/313 |
| 7,979,588 | B1 * | 7/2011 | Tran ...................... | G06F 13/387 709/253 |
| 2002/0026551 | A1 * | 2/2002 | Kamimaki .............. | G06F 13/28 710/260 |
| 2003/0110325 | A1 | 6/2003 | Roach et al. | |

(Continued)

FOREIGN PATENT DOCUMENTS

KR    1020030043447 A    6/2003

OTHER PUBLICATIONS

Roget's 21st Century Thesaurus: "while", 2013, Phillip Lief Group, Third Edition, <https://www.thesaurus.com/browse/while?s=t>.*

*Primary Examiner* — Faisal M Zaman
(74) *Attorney, Agent, or Firm* — William Park & Associates Ltd.

(57) ABSTRACT

An electronic system includes a serial system bus interface having a root complex and an end point, a command bus and a data bus coupled to the serial system bus interface, a memory device coupled to the data bus, and a direct memory access (DMA) controller coupled to both the command bus and the data bus to directly access the memory device in response to request commands which are transmitted from the root complex to the end point. The DMA controller includes a command queue in which the request commands stand by.

20 Claims, 4 Drawing Sheets

(56) References Cited

U.S. PATENT DOCUMENTS

| | | | | |
|---|---|---|---|---|
| 2006/0004931 A1* | 1/2006 | Weatherspoon | ........ | G06F 13/28 710/22 |
| 2008/0077716 A1* | 3/2008 | Sawai | ...................... | G06F 13/28 710/23 |
| 2008/0189720 A1* | 8/2008 | Moertl | .................. | G06F 13/102 719/314 |
| 2012/0030730 A1* | 2/2012 | Smith | .................... | H04L 67/125 726/2 |
| 2012/0254587 A1* | 10/2012 | Biran | .................... | G06F 9/3877 712/34 |
| 2014/0281588 A1* | 9/2014 | Vogan | .................... | G06F 21/79 713/193 |
| 2015/0356036 A1* | 12/2015 | Feehrer | .................. | G06F 13/16 710/263 |
| 2016/0004477 A1* | 1/2016 | Okada | ...................... | G06F 5/12 710/4 |
| 2016/0224479 A1* | 8/2016 | Shigeta | ..................... | G06F 3/06 |
| 2017/0351426 A1* | 12/2017 | Anderson | ............... | G06F 3/061 |
| 2018/0004558 A1* | 1/2018 | Das Sharma | ....... | G06F 13/1663 |

* cited by examiner

ELECTRONIC SYSTEMS HAVING SERIAL SYSTEM BUS INTERFACES AND DIRECT MEMORY ACCESS CONTROLLERS AND METHODS OF OPERATING THE SAME

CROSS-REFERENCE TO RELATED APPLICATIONS

The present application claims priority under 35 U.S.C 119(a) to Korean Application No. 10-2017-0049405, filed on Apr. 17, 2017, which is herein incorporated by references in its entirety.

BACKGROUND

1. Technical Field

Various embodiments of the present disclosure generally relate to electronic systems and, more particularly, to electronic systems having serial system bus interfaces and direct memory access controllers and methods of operating the same.

2. Related Art

Recently, an interface referred to as a 'peripheral component interconnect express (PCIe)' has been widely used instead of a PCI interface. The PCI interface may transmit data in parallel, and the PCIe interface may transmit data in series. The PCIe interface bus may be used to connect a central processing unit (CPU) to peripheral devices and may also be used as a core service channel of a calculation and storage device. The PCIe interface technique may exhibit relatively high protocol efficiency, an ordinary latency performance, a relative low power consumption, and a low cost, as compared with other system interface techniques.

In the electronic system using the PCIe interface bus, a direct memory access (DMA) technique may be employed for efficient use of the CPU. According to the DMA technique, a peripheral input/output (I/O) device of the electronic system may directly access a memory device of the electronic system through a DMA controller of the electronic system without utilizing the CPU. Thus, the peripheral I/O device may directly communicate with the memory device even while the CPU executes other processes. After the peripheral I/O device directly accesses the memory device through the DMA controller and executes a read operation or a write operation, the DMA controller may generate an interrupt signal to notify the CPU of termination of the read operation or the write operation. In such a case, the CPU may not request that the DMA controller execute the next operation until the interrupt signal is inputted to the CPU. This may cause degradation of performance of the electronic system.

SUMMARY

Various embodiments are directed to electronic systems having serial system bus interfaces and direct memory access (DMA) controllers and methods of operating the same.

According to an embodiment, an electronic system includes a serial system bus interface having a root complex and an end point, a command bus and a data bus coupled to the serial system bus interface, a memory device coupled to the data bus, and a direct memory access (DMA) controller coupled to both the command bus and the data bus to directly access the memory device in response to request commands which are transmitted from the root complex to the end point. The DMA controller includes a command queue in which the request commands stand by.

According to another embodiment, there is provided a method of operating an electronic system including a serial system bus interface having a root complex and an end point, a command bus and a data bus coupled to the serial system bus interface, a memory device coupled to the data bus, and a direct memory access (DMA) controller coupled to both the command bus and the data bus to directly access the memory device in response to request commands transmitted from the root complex to the end point. The method includes sequentially transmitting the request commands from the root complex to the end point in response to a request of a central processing unit (CPU), storing the request commands into a command queue included in the DMA controller, and sequentially performing DMA control operations in association with the memory device. The DMA control operations performed in association with the memory device are executed by the DMA controller according to the request commands that stand by in the command queue.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Figure 1:
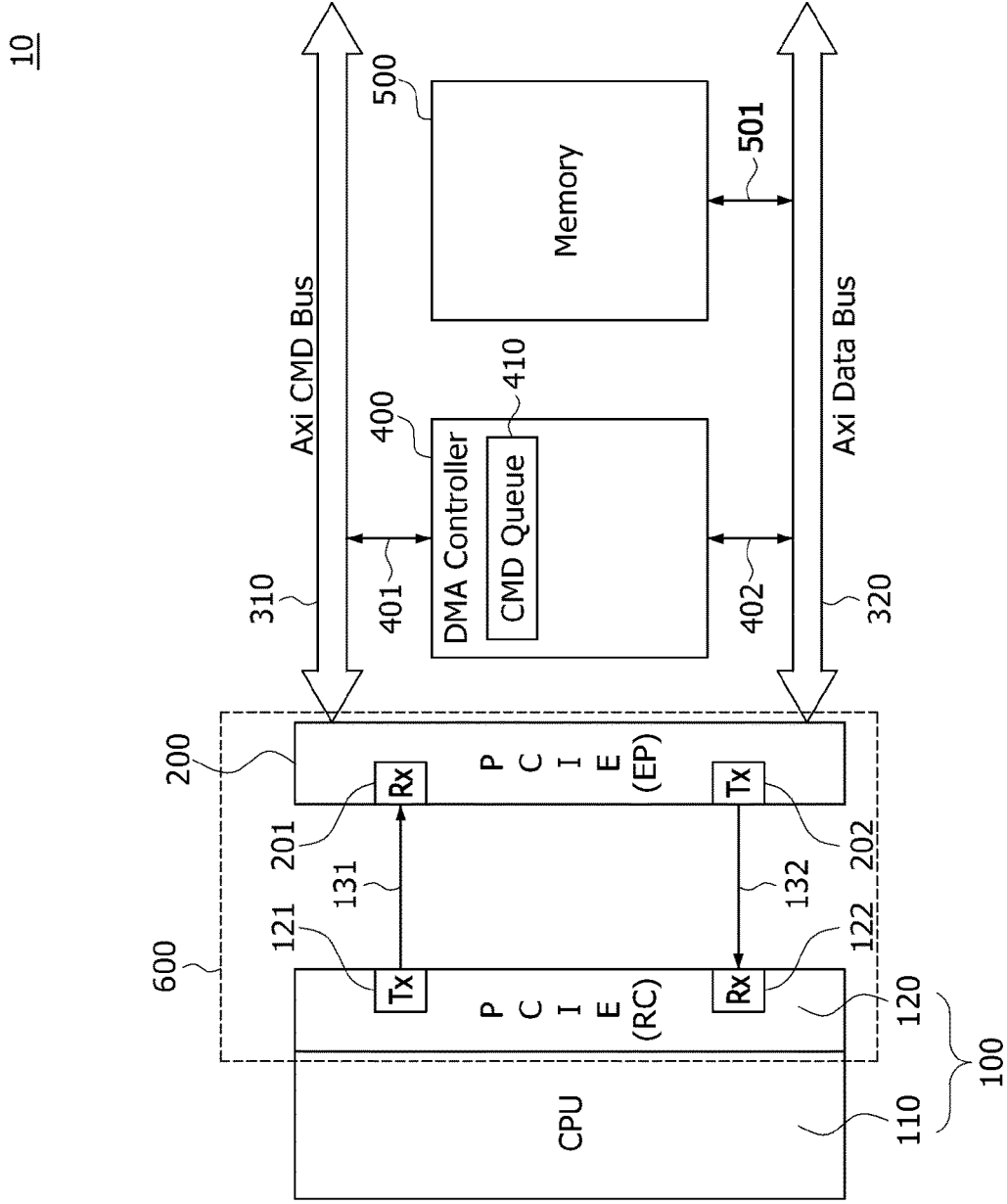
FIG. 1 is a block diagram illustrating an electronic system according to an embodiment of the present disclosure.

FIG. 1 is a block diagram illustrating an electronic system 10 according to an embodiment of the present disclosure. Referring to FIG. 1, the electronic system 10 according to an embodiment may include a serial system bus interface 600, for example, a PCIe bus interface. The PCIe bus interface may include a PCIe root complex (RC) 120, a PCIe end point (EP) 200, and first and second transmission lines 131 and 132. The electronic system 10 may also include a CPU 110. The CPU 110 and the PCIe RC 120 may function as a host device 100. In some embodiments, the PCIe RC 120 may be integrated in the CPU 110.

The PCIe RC 120 may include a transmission terminal 121 and a reception terminal 122. The PCIe EP 200 may also include a transmission terminal 202 and a reception terminal 201. The transmission terminal 121 of the PCIe RC 120 may be coupled to the reception terminal 201 of the PCIe EP 200 through the first transmission line 131. Accordingly, signals on the first transmission line 131 may be transmitted from the transmission terminal 121 of the PCIe RC 120 toward the reception terminal 201 of the PCIe EP 200. The transmission terminal 202 of the PCIe EP 200 may be coupled to the reception terminal 122 of the PCIe RC 120 through the second transmission line 132. Accordingly, signals on the second transmission line 132 may be transmitted from the transmission terminal 202 of the PCIe EP 200 toward the reception terminal 122 of the PCIe RC 120.

A command bus 310 and a data bus 320 may be coupled to the serial system bus interface 600. The PCIe EP 200 may communicate with other devices through the command bus 310 and the data bus 320. While the command bus 310 transmits commands, the data bus 320 may transmit data. In some embodiments, the command bus 310 and the data bus 320 may be advanced extensible interface (Axi) buses. The PCIe EP 200 may transform an interface form of request commands outputted from the PCIe RC 120 of the host device 100 according to an interface regulation of the command bus 310 before transmitting the transformed request commands to the other devices through the command bus 310. For example, the PCIe EP 200 may transform request commands outputted from the PCIe RC 120 of the host device 100 into an advanced extensible interface (Axi) form and may transmit the transformed request commands having the Axi form to a command queue a 410 and to the other devices through the command bus 310. In addition, the PCIe EP 200 may receive data from a memory device 500 included in the electronic system 10 through the data bus 320 and may transmit the data to the PCIe RC 120 of the host device 100.

The electronic system 10 may further include a DMA controller 400. The command bus 310 and the data bus 320 may be coupled to the DMA controller 400. The DMA controller 400 may be coupled to the command bus 310 through a first sub-bus 401 and may be coupled to the data bus 320 through a second sub-bus 402. The request command transformed by the PCIe EP 200 into the advanced extensible interface (Axi) form may be transmitted to the command queue 410 of the DMA controller 400 through the command bus 310 and the first sub-bus 401. The DMA controller 400 may transmit a setting value corresponding to the request command to the memory device 500 through the second sub-bus 402 and the data bus 320 to directly access the memory device 500 without using the CPU 110. Furthermore, the DMA controller 400 may directly access the memory device 500 in response to request commands transmitted from the root complex PCIe RC 120 to the PCIe EP 200.

In the present embodiment, the DMA controller 400 may include the command queue 410. The command queue 410 may store request commands outputted from the host device 100 through the PCIe EP 200. If the request commands are stored in the command queue 410 and the request commands stand by, the DMA controller 400 may transmit setting values corresponding to the request commands to the memory device 500 so that the memory device 500 performs operations corresponding to request commands. An operation of the DMA controller 400 described above may be independently performed regardless of an operation that data is transmitted from the memory device 500 to the PCIe RC 120 through the data bus 320 and the PCIe EP 200.

The memory device 500 may be coupled to the data bus 320 through a third sub-bus 501. In some embodiments, the memory device 500 may be a dynamic random access memory (DRAM) device or a static random access memory (SRAM) device. This memory device 500 may be used as a main memory device or an auxiliary memory device of the electronic system 10. Alternatively, the memory device 500 may be a data storage device which is coupled to the host device 100 through the serial system bus interface 600. For example, the memory device 500 may be a solid state disk (SSD). The memory device 500 may perform a read operation or a write operation in response to the setting value outputted from the DMA controller 400.

Figure 2:
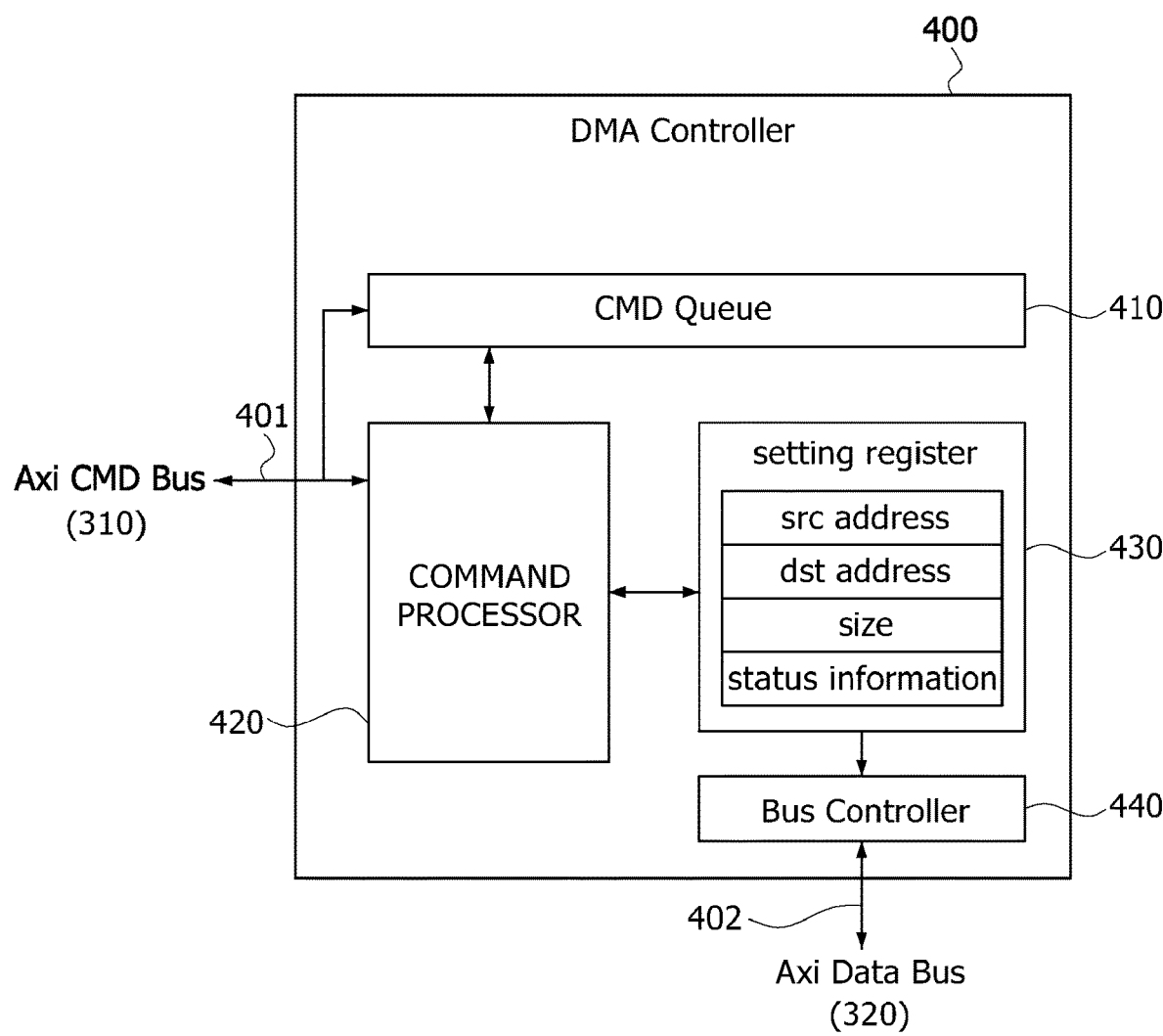
FIG. 2 is a block diagram illustrating an example of a direct memory access (DMA) controller included in the electronic system of FIG. 1.
Figure 3:
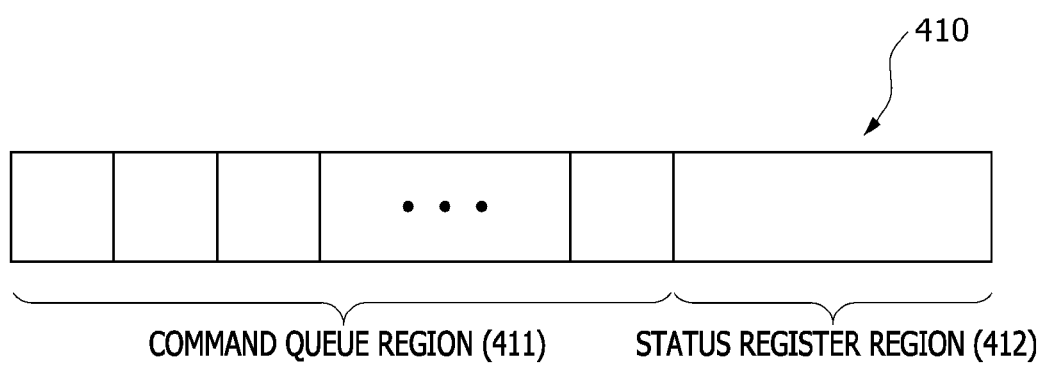
FIG. 3 is a schematic view illustrating an example of a command queue included in the DMA controller of FIG. 2.

FIG. 2 is a block diagram illustrating an example of the DMA controller 400 included in the electronic system 10 of FIG. 1, and FIG. 3 is a schematic view illustrating an example of the command queue 410 included in the DMA controller 400 of FIG. 2. Referring to FIGS. 1, 2 and 3, the DMA controller 400 may be configured to include the command queue 410, a command processor 420, a setting register 430, and a bus controller 440. The command queue 410 may include a command queue region 411 and a status register region 412, as illustrated in FIG. 3. The command queue region 411 may store the request commands outputted from the PCIe RC 120 through the command bus 310 and the first sub-bus 401. In some embodiments, a storage capacity of the command queue region 411 may be set by the CPU 110 of the host device 100. The status register region 412 may store information data about a status of the command queue region 411.

The command processor 420 may perform a control operation that sequentially executes the request commands which are stored in the command queue 410 and the request commands stand by. Specifically, the command processor 420 may input the setting values of the request commands stored in the command queue 410 into the setting register 430. In some embodiments, the setting value of each of the request commands may include a source address, a destination address, a data size, and status information on the command queue 410.

The setting register 430 may store the setting values outputted from the command processor 420 therein and may transmit the stored setting values to the bus controller 440. In order to perform the above operation, the setting register 430 may include a first storage element in which the source address (src address) is stored, a second storage element in which the destination address (dst address) is stored, a third storage element in which the data size is stored, and a fourth storage element in which the status information of the command queue 410 is stored. After receiving the setting values from the setting register 430, the bus controller 440 may transmit the setting values to the memory device 500 through the second sub-bus 402 and the data bus 320.

Figure 4:
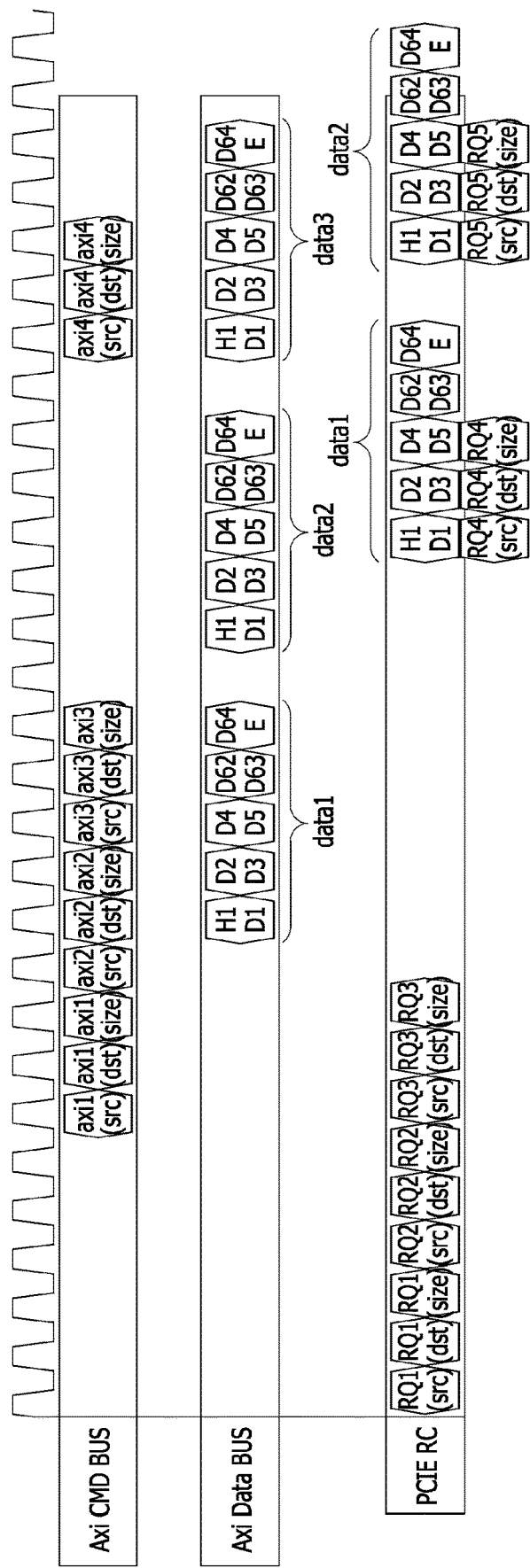
FIG. 4 is a timing diagram illustrating an operation of the electronic system shown in FIG. 1.

FIG. 4 is a timing diagram illustrating an operation of the electronic system 10 shown in FIG. 1. Referring to FIGS. 1 to 4, the PCIe RC 120 may sequentially transmit a first set of request commands RQ1(src), RQ1(dst), and RQ1(size) to the reception terminal 201 of the PCIe EP 200 through the transmission terminal 121, in response to a request of the CPU 110. Subsequently, the PCIe RC 120 may sequentially transmit a second set of request commands RQ2(src), RQ2 (dst), and RQ2(size) to the reception terminal 201 of the PCIe EP 200 without any delay. In addition, the PCIe RC 120 may also sequentially transmit a third set of request commands RQ3(src), RQ3(dst), and RQ3(size) to the reception terminal 201 of the PCIe EP 200 without any delay. In the case of a general electronic system, after an interrupt signal for notification of termination of operations corresponding to a first set of request commands is generated, another set of request commands may be transmitted. However, according to the electronic system 10 described above, the request commands are all stored in the command queue 410 and the request commands stand by. Thus, all of the request commands may be successively transmitted without any time break regardless of operations performed by the DMA controller 400.

After sequentially receiving the first to third sets of request commands RQ1(src), RQ1(dst), RQ1(size), RQ2 (src), RQ2(dst), RQ2(size), RQ3(src), RQ3(dst), and RQ3 (size), the PCIe EP 200 may transform the first to third sets of request commands into an advanced extensible interface (Axi) form. Subsequently, the PCIe EP 200 may sequentially transmit a first set of transformed request commands axi1 (src), axi1(dst), and axi1(size), a second set of transformed request commands axi2(src), axi2(dst), and axi2(size), and a third set of transformed request commands axi3(src), axi3 (dst), and axi3(size) to the command queue 410 of the DMA controller 400 through the command bus 310. The transformed request commands having the Axi form may stand by in the command queue 410.

The command processor 420 of the DMA controller 400 may sequentially store the setting values of the request commands into the setting register 430 as the request commands are stored into the command queue 410. Specifically, the command processor 420 may store the source address, the destination address, the data size, and the status information of the first set of transformed request commands axi1(src), axi1(dst), and axi1(size) into the first to fourth storage elements of the setting register 430. The bus controller 440 may transmit the setting values stored in the setting register 430 to the memory device 500 through the second sub-bus 402 and the data bus 320.

The memory device 500 may perform a read operation or a write operation in response to the setting values which are transmitted through the second sub-bus 402 and the data bus 320. In the case of a read operation, the memory device 500 may transmit first read data DATA1 corresponding to the first set of transformed request commands axi1(src), axi1 (dst), and axi1(size) to the PCIe EP 200 through the data bus 320 in response to the setting values which are transmitted through the second sub-bus 402 and the data bus 320. After receiving the first read data DATA1, the PCIe EP 200 may output the first read data DATA1 to the reception terminal 122 of the PCIe RC 120 through the transmission terminal 202 and the second transmission line 132. Because the first transmission line 131 is in an idle state while the first read data DATA1 is transmitted to the reception terminal 122 of the PCIe RC 120 through the transmission terminal 202 and the second transmission line 132, the first PCIe RC 120 may transmit a fourth set of request commands RQ4(src), RQ4 (dst), and RQ4(size) to the PCIe EP 200 through the first transmission line 131 in response to a request of the CPU 110.

If a size the first read data DATA1 is greater than a width (e.g., the number of bits) of the data bus 320, the first read data DATA1 may be divided into two or more data blocks and each of the divided data blocks may be transmitted through the data bus 320. For example, a first data block of the first read data DATA1 may include a header H1 and data D1, and second to fourth data blocks of the first read data DATA1 may include data D2, D3, D4, D5, . . . , D62 and D63. The last data block may include data D64 and status data E. The status data E may include read data about the status information on the command queue 410 which is transmitted from the memory device 500 to the PCIe EP 200. The status information on the command queue 410 may be stored in the status register region 412 of the command queue 410 included in the DMA controller 400 and may act as data notifying the host device 100 of execution of data transmission by the first set of request commands RQ1(src), RQ1(dst), RQ1(size). Thus, the host device 100 may recognize the achievement of a memory access operation in association with the first set of request commands RQ1(src), RQ1(dst), and RQ1(size) even without receiving any interrupt signal that notifies the termination of operations of the DMA controller 400.

If the setting values stored in the setting register 430 of the DMA controller 400 are transmitted to the memory device 500, the command processor 420 may store the setting values in association with the second set of transformed request commands axi2(src), axi2(dst), and axi2(size) into the setting register 430. Subsequent operations performed by the setting register 430, the bus controller 440, and the memory device 500 may be processed the same according to the first set of transformed request commands axi1(src), axi1(dst), and axi1(size). The operation of the command processor 420 included in the DMA controller 400 may be repeatedly and successively performed for all of the request commands which are stored in the command queue 410 and the request commands stand by.

The memory device 500 may transmit second read data DATA2 corresponding to the second set of transformed request commands axi2(src), axi2(dst), and axi2(size) to the PCIe EP 200 through the data bus 320 in response to subsequent setting values which are outputted from the DMA controller 400 through the second sub-bus 402 and the data bus 320. Subsequently, the memory device 500 may transmit third read data DATA3 corresponding to the third set of transformed request commands axi3(src), axi3(dst), and axi3(size) to the PCIe EP 200 through the data bus 320 in response to subsequent setting values which are outputted from the DMA controller 400 through the second sub-bus 402 and the data bus 320. The PCIe EP 200 may sequentially transmit the second and third read data DATA2 and DATA3 to the PCIe RC 120 through the transmission terminal 202 and the second transmission line 132. In one example, the second transmission line 132 may be a mono-directional transmission line through which data, second and third read data DATA2 and DATA3 for example, are transmitted from the PCIe EP 200 to the PCIe RC 120.

While the first read data DATA1 is transmitted to the PCIe RC 120, the fourth set of request commands RQ4(src), RQ4(dst), and RQ4(size) may be transmitted from the PCIe RC 120 to the PCIe EP 200 through the first transmission line 131. The first transmission line 131 may be a mono-directional transmission line through which request commands may be transmitted from the PCIe RC 120 to the PCIe EP 200. Similarly, while the second read data DATA2 is transmitted to the PCIe RC 120, a fifth set of request commands RQ5(src), RQ5(dst), and RQ5(size) may be transmitted from the PCIe RC 120 to the PCIe EP 200 through the first transmission line 131. That is, the transmission of the request commands from the PCIe RC 120 to the PCIe EP 200 may be performed regardless of which data transmission is performed. Similarly, the data transmission from the PCIe EP 200 to the PCIe RC 120 may be performed regardless of the transmission of the request commands.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. An electronic system comprising:
a serial system bus interface having a root complex and an end point;
a command bus and a data bus coupled to the serial system bus interface;
a memory device coupled to the data bus; and
a direct memory access (DMA) controller, configured to be coupled to both the command bus and the data bus to directly access the memory device in response to request commands which are transmitted from the root complex to the end point and additionally configured to include a command queue in which the request commands stand by,
wherein the request commands are successively transmitted from the root complex to the command queue through the end point and the command bus,
wherein the DMA controller controls a read operation of the memory in response to the request commands, thereby a read data, from the memory, is transmitted to the root complex through the data bus and the end point, and
wherein a transferring of the request commands to the DMA controller and a transferring of the read data from the memory device occur in the root complex at substantially the same time.

2. The electronic system of claim 1, wherein the serial system bus interface is a peripheral component interconnect express (PCIe) bus interface.

3. The electronic system of claim 1, wherein the root complex functions as a host device together with a central processing unit (CPU).

4. The electronic system of claim 1,
wherein the root complex and the end point may be coupled to each other through a first transmission line transmitting the request commands and a second transmission line transmitting data;
wherein the first transmission line is configured to include a mono-directional transmission line through which the request commands are transmitted from the root complex toward the end point; and
wherein the second transmission line is configured to include a mono-directional transmission line through which the data is transmitted from the end point toward the root complex.

5. The electronic system of claim 1, wherein the command bus and the data bus are advanced extensible interface (Axi) buses.

6. The electronic system of claim 5, wherein the end point transforms the request commands outputted from the root complex into an Axi form and transmits the transformed request commands to the command queue.

7. The electronic system of claim 1,
wherein the memory device includes a data storage device which is coupled to a host device through the serial system bus interface; and
wherein the data storage device is a dynamic random access memory (DRAM) device or a static random access memory (SRAM) device.

8. The electronic system of claim 1, wherein the command queue includes a command queue region storing the request commands which are transmitted through the command bus.

9. The electronic system of claim 8, wherein the command queue further includes a status register region storing information data about a status of the command queue region.

10. The electronic system of claim 1, wherein the DMA controller further includes:
a command processor configured to generate setting values of the request commands which are stored in the command queue to stand by; and
a setting register configured to store the setting values.

11. The electronic system of claim 10, wherein the setting values include a source address, a destination address, a data size, and status information on the command queue.

12. The electronic system of claim 11, wherein the status information on the command queue is included in data which is transmitted from the memory device to the end point.

13. A method of operating an electronic system including a serial system bus interface having a root complex and an end point, a command bus and a data bus coupled to the serial system bus interface, a memory device coupled to the data bus, and a direct memory access (DMA) controller configured to be coupled to both the command bus and the data bus to directly access the memory device in response to request commands transmitted from the root complex to the end point, the method comprising:
sequentially transmitting the request commands from the root complex to the end point in response to a request of a central processing unit (CPU);
storing the request commands into a command queue included in the DMA controller;
sequentially performing DMA control operations in association with the memory device, which are executed by the DMA controller according to the request commands that stand by in the command queue; and
transmitting a read data from the memory to the root complex through the data bus and the end point in response to the request commands,
wherein a transferring of the request commands to the DMA controller and a transferring of the read data from the memory device occur at substantially the same time in the root complex.

14. The method of claim 13, wherein the request commands are transmitted to the command queue included in the DMA controller through the command bus.

15. The method of claim 14, wherein the command queue includes a command queue region storing the request commands which are transmitted through the command bus.

16. The method of claim 15, wherein the command queue further includes a status register region storing information data about a status of the command queue region.

17. The method of claim 14, further comprising transforming an interface form of the request commands according to an interface regulation of the command bus before the request commands are transmitted through the command bus.

18. The method of claim 13, wherein sequentially performing the DMA control operations in association with the memory device includes:
transmitting setting values of the request commands to the memory device;

transmitting read data of the memory device to the end point through the data bus in response to the setting values; and transmitting the read data from the end point to the root complex.

19. The method of claim 18, wherein the setting values include a source address, a destination address, a data size, and status information on the command queue.

20. The method of claim 18, wherein the status information on the command queue is included in read data which is transmitted from the memory device to the end point.

* * * * *